(12) United States Patent
Ott

(10) Patent No.: X6037
(45) Date of Patent: Jun. 18, 1830

(54) IMPROVEMENT IN THE APPARATUS AND PROCESS FOR MANUFACTURING OR PREPARING SODA WATER

(76) Inventor: George Ott

The United States of America

TO ALL TO WHOM THESE Letters Patent SHALL COME:

Whereas George Ott, A Citizen of
the United States hath alleged that he has invented a new and useful improvement
in the apparatus & process for manufacturing
or preparing Soda Water
which improvement he states has not been known or used before his application; hath [illegible]
that he does verily believe that he is the true inventor or discoverer of the said improvement; hath
paid into the treasury of the United States the sum of thirty dollars, delivered a receipt for
the same, and presented a petition to the Secretary of State, signifying a desire of obtaining an
exclusive property in the said improvement, and praying that a patent may be granted for that
purpose: These are therefore to grant, according to law, to the said Geo: Ott
his heirs, administrators or assigns, for the term of fourteen years, from the eighteenth day of
June one thousand eight hundred and thirty the full and exclusive right and
liberty of making, constructing, using and vending to others to be used, the said improvement;
a description whereof is given in the words of the said Geo: Ott himself,
in the schedule hereto annexed, and is made a part of these presents.

In Testimony whereof, I have caused these Letters to be made Patent, and the
Seal of the United States to be hereunto affixed.

GIVEN under my hand, at the City of Washington, this eighteenth day
of June in the year of our Lord one thousand eight hundred
and thirty and of the independence of the United States of America
the fifty fourth.

Andrew Jackson

BY THE PRESIDENT.

M Van Buren Secretary of State.

City of Washington, TO WIT:
I DO HEREBY CERTIFY, That the foregoing Letters Patent were deli-
vered to me on the eighteenth day of June in the year of our
Lord one thousand eight hundred and thirty to be examined;
that I have examined the same, and find them conformable to law; and
I do hereby return the same to the Secretary of State, within fifteen days
from the date aforesaid, to wit: on this eighteenth day of June
in the year aforesaid.

Jn. Macpherson Berrien Attorney General of the United States.

The United States of America

TO ALL TO WHOM THESE Letters Patent SHALL COME:

Whereas George Ott, A Citizen of the United States hath alleged that he has invented a new and useful improvement in the apparatus & process for manufacturing
or preparing Soda Water which improvement he states has not been known or used before his application; hath [illegible]
that he does verily believe that he is the true inventor or discoverer of the said improvement; hath
paid into the treasury of the United States the sum of thirty dollars, delivered a receipt for
the same, and presented a petition to the Secretary of State, signifying a desire of obtaining an
exclusive property in the said improvement, and praying that a patent may be granted for that
purpose. These are therefore to grant, according to law, to the said Geo: Ott
his heirs, administrators or assigns, for the term of fourteen years, from the eighteenth day of
June one thousand eight hundred and thirty the full and exclusive right and
liberty of making, constructing, using and vending to others to be used, the said improvement
a description whereof is given in the words of the said Geo: Ott [illegible] himself
in the schedule hereto annexed, and is made a part of these presents.

In Testimony whereof, I have caused these Letters to be made Patent [illegible]

June one thousand eight hundred and thirty . . . [illegible]
liberty of making, constructing, using and vending to others to be used, the said improvement;
a description whereof is given in the words of the said Geo. Ott himself,
in the schedule hereto annexed, and is made a part of these presents.

In Testimony whereof, I have caused these Letters to be made Patent, and the Seal of the United States to be hereunto affixed.

GIVEN under my hand, at the City of Washington, this eighteenth day of June in the year of our Lord one thousand eight hundred and thirty and of the independence of the United States of America the fifty fourth.

Andrew Jackson

BY THE PRESIDENT.

M Van Buren Secretary of State.

City of Washington, TO WIT:

I DO HEREBY CERTIFY, That the foregoing Letters Patent were delivered to me on the eighteenth day of June in the year of our Lord one thousand eight hundred and thirty to be examined; that I have examined the same, and find them conformable to law; and I do hereby return the same to the Secretary of State, within fifteen days from the date aforesaid, to wit: on this eighteenth day of June in the year aforesaid.

[illegible] Jn. MacPherson Berrien Attorney General of the United States.

The Schedule referred to in these Letters Patent, and making part of the same, containing a description in the words of the said George Ott himself, of his Improvement in the apparatus & process for manufacturing or preparing Soda Water.

To all whom it may concern, be it known that I, George Ott of Norfolk, in the County of Norfolk & State of Virginia, have invented certain useful improvements in the apparatus and process for manufacturing or preparing, the beverage usually de-nominated Soda Water, and that the following is a full and exact description of my said improvements. In the apparatus, as usually constructed, the water & gas are contained in, and conducted through vessels and passages formed of brass or copper, the effect of which is not merely to communicate an unpleasant taste to the water, but to impregnate it with salts of copper, the whole of which are extremely deleterious. To obviate these objections and to render the apparatus more economical and efficient, are the objects which I claim to have accomplished. Instead of using brass, or copper, I employ block tin, or an alloy thereof, in every case, excepting for the forcing pump. All the other parts, such as the conductors, pipes, coolers, traversing pipes, screws & cistern, which are usually made of the former metals, I make of the latter, excepting in certain cases. I dispense altogether with a metallic cistern, and form one of wood, so constructing and coating it as to give it sufficient strength, and to render it completely impervious to air and water, under the immense pressure to which it is to be subjected.

As

The Schedule referred to in these Letters Patent,
and making part of the same, containing a description in the
words of the said George Ott himself, of his Improvement
in the apparatus & process for manufacturing or preparing
Soda Water.

---

To all whom it may concern, be it known that I, George
Ott of Norfolk, in the County of Norfolk & State of Virginia,
have invented certain useful improvements in the apparatus and
process for manufacturing or preparing, the beverage usually de-
-nominated Soda Water, and that the following is a full and exact
description of my said improvements. In the apparatus, as
usually constructed, the water & gas are contained in, and conducted
through vessels and passages formed of brass or copper, the effect of
which is not merely to communicate an unpleasant taste to the water,
but to impregnate it with salts of copper, the whole of which are extreme-
-ly deleterious. To obviate these objections and to render the apparatus
more economical and efficient, are the objects which I claim to have ac-
-complished. Instead of using brass, or copper, I employ block tin, or an
alloy thereof, in every case, excepting for the forcing pump. All the
other parts, such as the conductors, pipes, coolers, traversing pipes, screws
& cistern, which are usually made of the former metals, I make of the
latter, excepting in certain cases. I dispense altogether with a metallic
cistern, and form one of wood, so constructing and coating it as to give it
sufficient strength, and to render it completely impervious to air and
water, under the immense pressure to which it is to be subjected.

The

The Schedule referred to in these Letters Patent,
and making part of the same, containing a description in the
words of the said George Ott himself, of his Improvement
in the apparatus & process for manufacturing or preparing
Soda Water.

---

To all whom it may concern, be it known that I, George
Ott of Norfolk, in the County of Norfolk & State of Virginia,
have invented certain useful improvements in the apparatus and
process for manufacturing or preparing, the beverage usually de-
-nominated Soda Water, and that the following is a full and exact
description of my said improvements. In the apparatus, as
usually constructed, the water & gas are contained in, and conducted
through vessels and passages formed of brass or copper, the effect of
which is not merely to communicate an unpleasant taste to the water
but to impregnate it with salts of copper, the whole [illegible] [illegible]

proceſs for manufacturing or preparing, the beverage usually de-
-nominated Soda Water, and that the following is a full and exact
description of my said improvements. In the apparatus, as
usually constructed, the water & gas are contained in, and conducted
through veſsels and paſsages formed of braſs or copper, the effect of
which is not merely to communicate an unpleasant taste to the water,
but to impregnate it with salts of copper, the whole of which are extreme-
-ly deleterious. To obviate these objections and to render the apparatus
more economical and efficient, are the objects which I claim to have ac-
-complished. Instead of using braſs, or copper, I employ block tin, or an
alloy thereof, in every case, excepting for the forcing pump. All the
other parts, such as the conductors, pipes, coolers, traversing pipes, screws
& cistern, which are usually made of the former metals, I make of the
latter, excepting in certain cases. I dispense altogether with a metallic
cistern, and form one of wood, so constructing and coating it as to give it
sufficient strength, and to render it completely impervious to air and
water, under the immense preſsure to which it is to be subjected.

As tin possesses less tenacity than brass, the screws, as well as some other parts, which are constructed thereof, have to be so formed, or modified, as to correspond with the nature of the material of which they are made; and the doing this forms one part of my improvement. In describing the particular form of certain parts, it is to be understood that it is not this, but the general principle and intention of such form, which I claim as my invention, as the same may admit of numerous modifications, still keeping the same object in view. In making my coupling boxes, I bring the two ends of the parts to be coupled, together, as two tubes for example; one of the tubes is furnished with a flanch, and the other with a male screw; — I then insert the collar of leather between the two ends, and this, being small, requires but little force to render it perfectly tight, which is effected by means of a box, made of block tin in the usual form, but stouter than ordinary, as may be more clearly seen by the drawing deposited in the Patent Office. I sometimes unite two parts together, without cutting a screw upon either; in this case the junction is made by bringing the faces, or ends, of the two parts together; and uniting them by means of an iron cramp, passing under one section, and pressing upon the other by a thumb-screw, a leather being interposed between the points of junction. When cocks are required, I take those which are usually called brass cocks, enlarge the hole in the key, and line it with block tin; I also line the tubular parts of the cock in the same manner; thus combining the strength of the original metal with the protecting quality of the tin. It is manifest that the copper or brass may be tinned, and afterwards covered As tin possesses less tenacity than brass, the screws, as well as some
other parts, which are constructed thereof, have to be so formed, or mod-
-ified, as to correspond with the nature of the material of which they
are made; and the doing this forms one part of my improvement.
In describing the particular form of certain parts, it is to be under-
-stood that it is not this, but the general principle and intention
of such form, which I claim as my invention, as the same may
admit of numerous modifications, still keeping the same object in
view. In making my coupling boxes, I bring the two ends of the
parts to be coupled, together, as two tubes for example, one of the tubes
is furnished with a flanch, and the other with a male screw; — I then
insert the collar of leather between the two ends, and this being [illegible]
requires but little force to render it [illegible] tight, which is [illegible]
by means of a box, made of block tin in the usual form, [illegible]
than ordinary, as may be more clearly seen in the [illegible]

parts to be coupled, together, as two tubes for example; one of the tubes is furnished with a flanch, and the other with a male screw; — I then insert the collar of leather between the two ends, and this, being small, requires but little force to render it perfectly tight, which is effected by means of a box, made of block tin in the usual form, but stouter than ordinary, as may be more clearly seen by the drawing deposited in the Patent Office. I sometimes unite two parts together, without cutting a screw upon either; in this case the junction is made by bringing the faces, or ends, of the two parts together; and uniting them by means of an iron cramp, passing under one section, and pressing upon the other by a thumb screw, a leather [illegible] interposed between the points of junction. When cocks are required, I take those which are usually called brass cocks, [illegible] the [illegible] in the key, and line it with block tin; I also line the tubular part of the cock in the same manner; thus combining the strength of the original metal with the protecting quality of the tin. [illegible] manifest that the copper or brass may be tinned, and afterwards

[illegible]

covered with a thick coat of block tin, or an alloy thereof, by casting;
and where extra strength may be required, I intend, sometimes, to do
this; all the beneficial effects from the block tin being thus as well secured
as though the whole was of that metal. When I construct my cisterns
of metal, I make them of block tin, rolled out into sheets, properly
formed, and united by soldering. These I insert in barrels of strong,
seasoned wood, hooped closely with stout iron, and the heads secured
by leaving three or four inches of the staves, at each end, projecting beyond
the head; this space is to have a block of wood fitted into it, which
should be so placed that its grain may cross that of the head, and it
is to be secured by iron bolts. When the cistern of block tin is placed
within the wooden vessel, cement is to be poured in between the two, so
as completely to fill the space, and sustain the metal in every part.
I intend sometimes to omit the metal lining altogether, using only the
wooden cistern, constructed as above. In this case, in order to render it
water and air-tight, I line, and fill the pores on the inside with a suit-
-able cement; for the purpose, I usually, combine together rosin, beeswax
and yellow ochre; or rosin, bees-wax, pitch & ochre, using such portion
of bees-wax as shall prevent its cracking, and such a quantity of ochre
as shall give it hardness and consistency; the inside of the cistern being
perfectly dry, is heated, and the melted cement poured in; the vessel is
then turned about and the superfluous portion allowed immediately
to drain out. After a fair and full trial, I have found cisterns of this
description to succeed perfectly. In preparing the Soda Water, when
a portion of common air is mixed with the Carbonic Acid, it communicates
an unpleasant, vapid taste to the water; to obviate this, in my preparatory

[illegible] with a thick coat of block tin, or an alloy thereof, by casting, and where extra strength may be required, I intend, sometimes, to do this; all the beneficial effects from the block tin being thus as well secured as though the whole was of that metal. When I construct my cisterns of metal, I make them of block tin, rolled out into sheets, properly formed, and united by soldering. These I insert in barrels of strong, seasoned wood, hooped closely with stout iron, and the heads secured by leaving three or four inches of the staves, at each end, projecting beyond the head; this space is to have a block of wood fitted into it, which should be so placed that its grain may cross that of the head, and it is to be secured by iron bolts. When the cistern of block tin is placed within the wooden vessel, cement is to be poured in between the two, so as completely to fill the space, and sustain the metal in every part.

I intend sometimes to omit the metal lining altogether, using only the wooden cistern [illegible]

[illegible] pipe, cement is to be poured in between the two, so [illegible] the space, [illegible] the metal in every part.

I intend sometimes to omit the metal lining altogether, using only the wooden cistern, constructed as above. In this case, in order to render it water and air-tight, I line, and fill the pores on the inside with a suit-able cement; for the purpose, I usually, combine together rosin, beeswax and yellow ochre; or rosin, bees-wax, pitch & ochre, using such portion of bees-wax as shall prevent its cracking, and such a quantity of ochre as shall give it hardness and consistency; the inside of the cistern, being perfectly dry, is heated, and the melted cement poured in; the vessel is then turned about and the superfluous portion allowed immediately to drain out. After a fair and full trial, I have found cisterns of this description to succeed perfectly. In preparing the Soda Water, when a portion of common air is mixed with the Carbonic Acid, it communicates an unpleasant, vapid, taste to the water; to obviate this, in my preparatory preparatory process for manufacturing it, I fill the cistern completely
with water, and expel about one third of this water by carbonic acid.
To effect this, I make an opening in the side of the cistern, one third of
its height below the top, which opening may be completely closed by
means of a screw; leaving this open, I introduce the gas until the
water is expelled, when I close it and proceed in the usual way.
What I claim, in the foregoing apparatus and in the mode of pro-
-cedure, as my invention, is the manner in which I employ block tin,
or an alloy of block tin, to conduct and retain the water and gas, of
soda water, to prevent the deleterious effects experienced from other
metals. I also claim the covering of brass, copper, or other metal, with
block tin by fusing, or casting it thereon, so as to leave it in a body
[illegible] duced by turning. I also claim
[illegible] bonic acid, in order
the expelling of [illegible] from the cistern, by [illegible]
that the chamber of condensed gas may consist entirely thereof.

G. Ott.

Witnesses,
A. McIntire
W. P. Elliot preparatory process for manufacturing it; I fill the cistern completely with water, and expel about one third of this water by carbonic acid. To effect this, I make an opening in the side of the cistern, one third of its height below the top, which opening may be completely closed by means of a screw; leaving this open, I introduce the gas until the water is expelled, when I close it and proceed in the usual way.

What I claim, in the foregoing apparatus and in the mode of procedure, as my invention, is the manner in which I employ block tin or an alloy of block tin, to conduct and retain the water and gas of soda water, to prevent the deleterious effects experienced from the metals. I also claim the covering of brass, copper, or other metals with block tin by fusing, or casting it thereon, so as to [illegible] [illegible] [illegible] [illegible] [illegible] [illegible] [illegible] [illegible] the expelling [illegible] from the cistern, [illegible] that the chamber [illegible] condensed [illegible] [illegible]

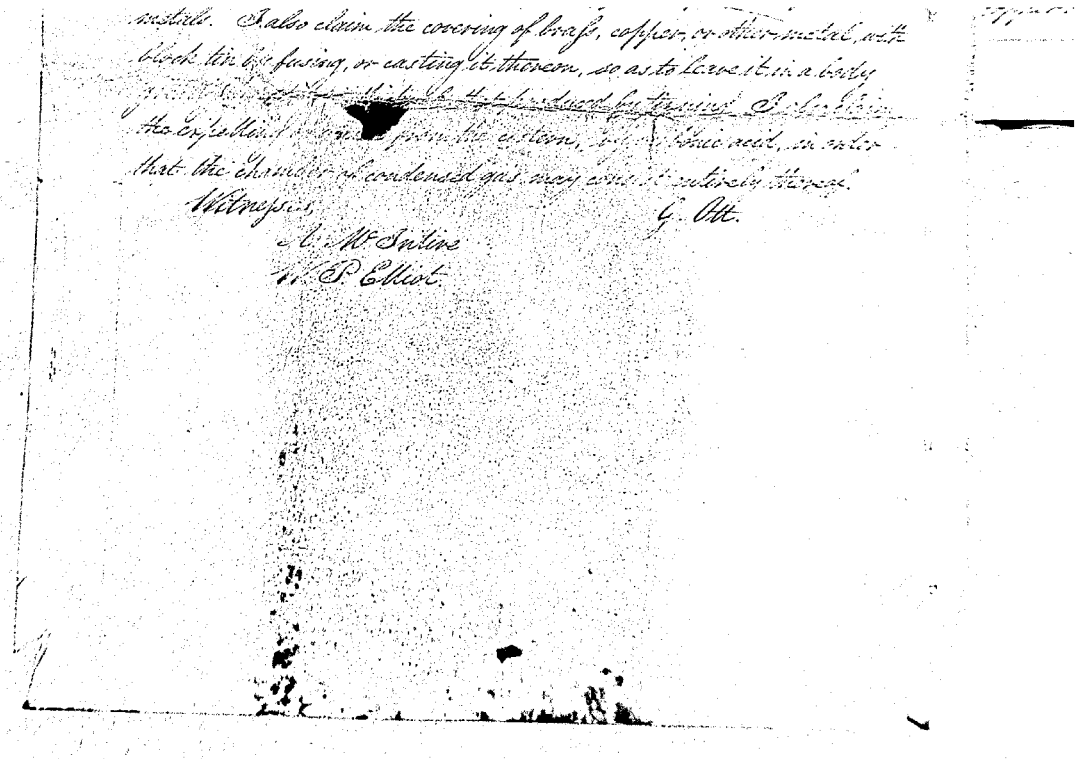
structed. I also claim the covering of brass, copper, or other metal, with block tin or fusing, or casting it thereon, so as to leave it in a body [illegible] the explosion [illegible] from the action, [illegible] acid, in order that the chamber of condensed gas may come [illegible] entirely through.
Witnesses,
C. W. McIntire
W. P. Elliot
G. Ott.

[illegible]
-cedure, as my invention, is the manner in which
or an alloy of block tin, to conduct and retain [illegible]
soda water, to prevent the deleterious effects [illegible]
metals. I also claim the covering of brass, copper [illegible]
block tin by fusing, or casting it thereon, so as to
[illegible] produced for [illegible]
the expelling of [illegible] from the cistern, [illegible]
that the chamber of condensed gas may [illegible]

Witnesses,
A. McIntire
[illegible] P Elliot.

[illegible] [illegible] [illegible] [illegible] in the mode of pro-
[illegible], as my invention, is the manner in which I employ block tin,
alloy of block tin, to conduct and retain the water and gas, of
water, to prevent the deleterious effects experienced from other
[illegible]. I also claim the covering of brass, copper, or other metal, with
tin by fusing, or casting it thereon, so as to leave it in a body
[illegible] [illegible] [illegible] [illegible] produced by tinning. I also claim
[illegible] [illegible] from the cistern, [illegible] [illegible] acid, in order
the chamber of condensed gas may consist entirely thereof.
Witnesses,                                   G. Ott.
A. McIntire
[illegible] P. Elliot or an alloy of block tin, to conduct water
soda water to prevent the deleterious
metals. I also claim the covering of brass
block tin by fusing, or casting it thereon,
the expulsion of [illegible] from the cistern,
that the chamber of condensed gas [illegible]

Witnesses,
S. McIntire
W. P. Elliot water is expelled, when I close it and proceed in the usual way.

What I claim, in the foregoing apparatus and in the mode of procedure, as my invention, is the manner in which I employ block tin, or an alloy of block tin, to conduct and retain the water and gas, of soda water, to prevent the deleterious effects experienced from other metals. I also claim the covering of brass, copper, or other metal, with block tin by fusing, or casting it thereon, so as to leave it in a body [illegible] produced by tinning. I also claim the expelling of [illegible] from the cistern, by [illegible]bonic acid, in order that the chamber of condensed gas may consist entirely thereof.

Witnesses,

A. McIntire

W. P. Elliot

G. Ott.